United States Patent
Hamada et al.

(10) Patent No.: US 7,076,357 B2
(45) Date of Patent: Jul. 11, 2006

(54) VEHICLE BRAKING CONTROL DEVICE FOR BRAKING FORCE DISTRIBUTION

(75) Inventors: Chiaki Hamada, Mishima (JP); Akifumi Doura, Obu (JP)

(73) Assignees: Toyota Jidosha Kabushiki Kaisha, Toyota (JP); Advics Co. LTD, Kariya (JP)

( * ) Notice: Subject to any disclaimer, the term of this patent is extended or adjusted under 35 U.S.C. 154(b) by 89 days.

(21) Appl. No.: 10/815,833

(22) Filed: Apr. 2, 2004

(65) Prior Publication Data

US 2004/0260447 A1     Dec. 23, 2004

(30) Foreign Application Priority Data

Apr. 7, 2003    (JP)    ............................. 2003-103131

(51) Int. Cl.
*B60T 8/28* (2006.01)
*B60T 13/00* (2006.01)

(52) U.S. Cl. ......................................... 701/70; 303/186
(58) Field of Classification Search .................... None
See application file for complete search history.

(56) References Cited

U.S. PATENT DOCUMENTS

| | | | | |
|---|---|---|---|---|
| 6,338,017 B1 * | 1/2002 | Kato et al. | ..................... | 701/79 |
| 6,354,676 B1 | 3/2002 | Oshiro | | |
| 6,443,540 B1 * | 9/2002 | Shimizu et al. | ............. | 303/177 |
| 6,546,326 B1 * | 4/2003 | Gerdes | ........................ | 701/70 |
| 2001/0013722 A1 | 8/2001 | Udaka | | |
| 2002/0024252 A1 | 2/2002 | Banno et al. | | |

FOREIGN PATENT DOCUMENTS

| | | | |
|---|---|---|---|
| JP | A 5-213169 | | 8/1993 |
| JP | 11-192930 | * | 7/1999 |
| JP | A 2001-219834 | | 8/2001 |
| JP | A 2003-160039 | | 6/2003 |

* cited by examiner

*Primary Examiner*—Michael J. Zanelli
(74) *Attorney, Agent, or Firm*—Oliff & Berridge, PLC

(57) ABSTRACT

A braking control device of a vehicle starts executing braking force distribution (BFD) biased to front wheels for avoiding the locking of rear wheels prior to the front wheel at appropriate time by reducing errors of a judgment of the starting of the control. Usually, the BFD control is started in response to the increase of a master cylinder pressure, assuming that the rear wheel braking pressure is equally increased. When a fast braking action occurs, the delay of the pressure variation of the rear wheel braking pressure relative to the master cylinder is conspicuous because the responsibility of a master cylinder pressure to the braking action is too fast. Thus, Upon a fast braking action, a judgment of starting of BFD control is made based upon a value involved with rear wheel braking force, such as an estimation value of the rear wheel braking pressure, having a slower responsibility to the braking action than the master cylinder pressure, and thereby preventing a premature start of the BFD control due to the delay of the rear wheel braking pressure. When a deceleration signal is used for the judgment of starting of BFD control, the signal is passed through a low-pass filter having a rather higher cut-off frequency on a fast braking action, in order to improve the responsibility of the signal to the braking action.

13 Claims, 5 Drawing Sheets

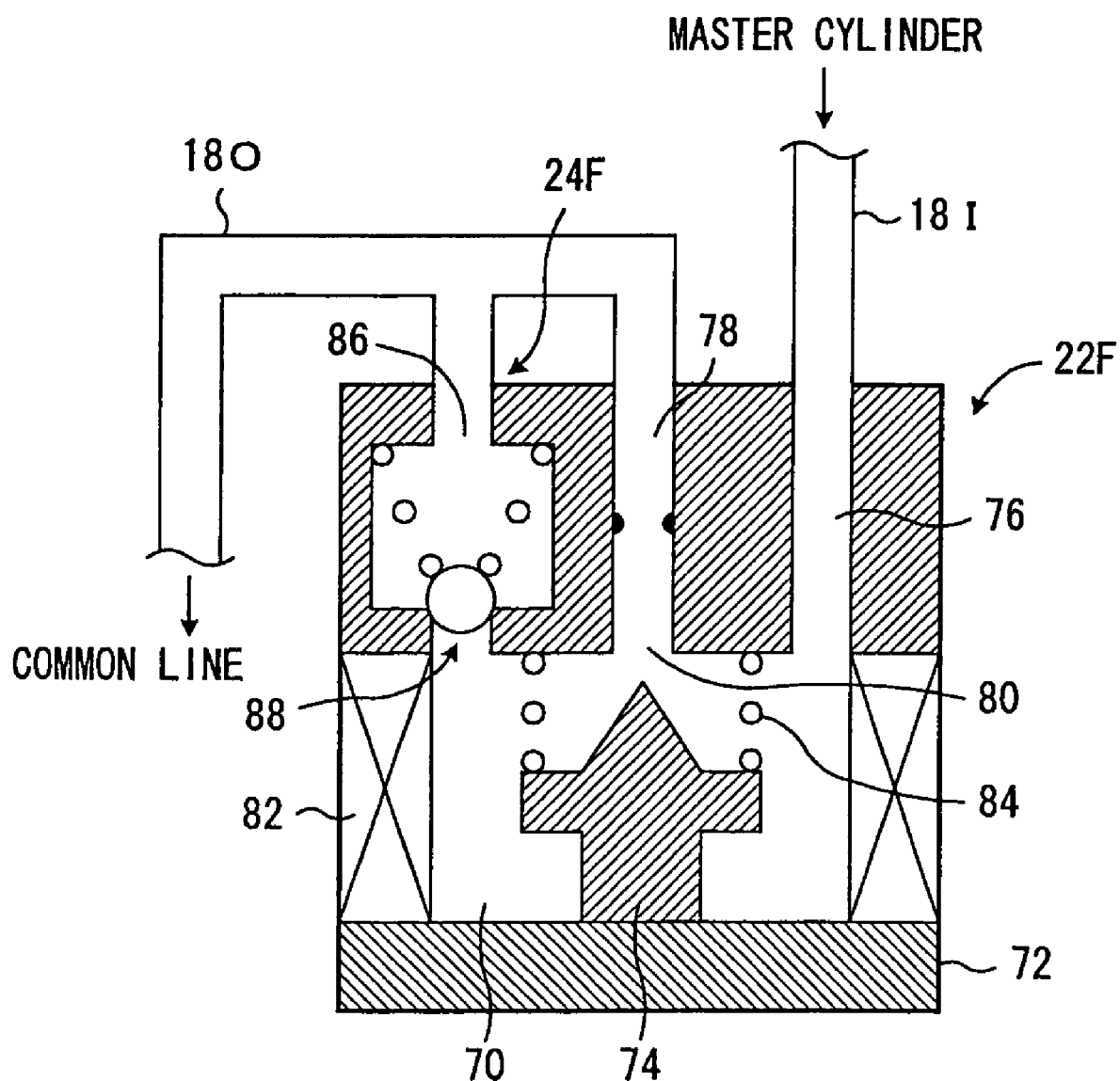

VEHICLE BRAKING CONTROL DEVICE FOR BRAKING FORCE DISTRIBUTION

BACKGROUND OF THE INVENTION

1. Field of the Invention

The present invention relates to a device for controlling brakes of a vehicle such as an automobile, and more specifically, to such a device that controls braking force distribution among front and rear wheels in a vehicle.

2. Description of Prior Art

During braking of a vehicle, a rear wheel is liable to be locked because its frictional circle is shrunk due to the forward shifting of the load of the vehicle. The locking of a rear wheel, prior to a front wheel, induces serious deterioration of a vehicle running behavior, such as disturbance in the attitude and/or spinning of a vehicle body. In order to avoid the locking of a rear wheel, braking force distribution (BFD) control has been proposed to keep braking force on rear wheels lower than on the front wheels. In such BFD control, braking pressures applied to rear wheel cylinders in a hydraulic braking system is held, reduced or pulsatively increased, i.e. the increase in braking force generated on rear wheels is restricted, providing a distribution of braking force biased to front wheels. Usually, BFD control, often referred to as "Electronic Braking force Distribution Control (EBD control)", is executed by a computerized device operating a plurality of solenoid valves in a hydraulic circuit. Examples of devices executing EBD control are seen in Japanese Laid-Open Patent Publications (JP) Nos. 5-213169 and 2001-219834.

By the way, the restriction of rear wheel braking force in BFD control is to be started when the braking force or braking pressure of the rear wheel exceeds an appropriately determined value. In some of the conventional BFD control devices, however, BFD control is not always started at an appropriate time due to several constraints involved in a physical structure of a braking system, especially when a braking action of a driver of a vehicle, such as the depression of a brake pedal, is fast.

For instance, in some control devices for a hydraulic braking system where no wheel cylinder pressure sensor is available, the BFD control is started in response to a master cylinder pressure increase on the assumption that the pressures in wheel cylinders is equal to a master cylinder pressure in absence of any special control operation. However, the pressure variations in wheel cylinders are delayed relative to the master cylinder because the transmission of a pressure variation in a master cylinder to wheel cylinders takes a certain time dependent upon the length and physical structures of piping between the master and wheel cylinders. The delay of the pressure variations in wheel cylinders, especially upon a rapid depression of a brake pedal, would cause a premature holding of the wheel cylinder at a pressure lower than to be held by closing the corresponding valves before the pressure in the master cylinder is fully reflected in the wheel cylinders.

Further, in some of the conventional BFD control devices, BFD control is started in response to the increase of deceleration of a vehicle, where a signal of the deceleration, detected with a sensor, is filtered through a low-pass filter having a predetermined cut-off frequency for eliminating noise components from the deceleration signal. Upon a rapid depression of a brake pedal, however, a higher frequency component (reflecting a rapid variation) in the deceleration signal is also eliminated by the low-pass filtering, resulting in delay of the detection of the actual deceleration increase and thus the starting of BFD control.

Accordingly, a BFD control device should be improved with respect to the accuracy in the timing of starting of the control.

SUMMARY OF INVENTION

According to the present invention, a braking control device of a vehicle, executing BFD control in which braking force on rear wheels is lowered in comparison with braking force on front wheels, is improved with respect to the starting of the BFD control. The vehicle to be equipped with the control device has front and rear wheels, a braking system generating braking forces on the respective wheels; means of acquiring a value involved with rear wheel braking forces including a sensor monitoring a braking action by a driver of the vehicle. The control device starts the BFD control in response to a judgment that BFD control is to be executed. For the judgment, a first value involved with rear wheel braking force is used under a normal condition, when the increasing rate of the braking action by the driver is low, or when the rate of the braking action by the driver, monitored by the sensor, does not exceed a predetermined value. But, when the rate of the braking action by the driver is high or exceeds the predetermined value, the judgment is done based upon a second value involved with rear wheel braking force.

As described above, the BFD control for constraining the rear wheel braking force is to be started when braking force on a rear wheel is increased in response to the braking action of the driver. Thus, a parameter for the judgment of starting of BFD control will be selected from some values involved with the braking force on the rear wheels, with considering the accuracy of a value together with physical constraints in a brake system and its manufacturing cost. However, since each of those values also has a different characteristic involved with a matter other than braking force on the rear wheels such as its responsibility to the variations of braking action of the driver, a single selected parameter is not always the best parameter for the judgment of starting of BFD control.

In the control device of the present invention, BFD control can be started at more appropriate time than ever by selecting a better parameter for the judgment of starting of BFD control depending upon the rate of the braking action of the driver. In other words, in accordance with the present invention, BFD control can be appropriately started irrespective of the rate of the braking action of the driver. The second parameter used on a fast braking action should be more slowly responsive to the braking action than the first value, allowing for that the variation of braking force on a rear wheel is delayed relative to the braking action and the delay becomes more conspicuous as the braking action is faster. Accordingly, the judgment of starting of braking force distribution control is made based upon the second value involved with rear wheel braking force having a slower responsibility to the braking action than the first value when an increasing rate of the braking action by the driver detected by the detector is higher.

Typically, a hydraulic braking system employed in a vehicle includes a master cylinder and wheel cylinders connected via a hydraulic circuit having a plurality of valves. Thus, the first value involved with a rear wheel braking force may be a value involved with a master cylinder pressure, and preferably, the value of the master cylinder pressure acquired with a master cylinder pressure sensor, when no rear wheel braking pressure sensor is available. Under a normal braking condition, the master cylinder pressure, directly (accurately) reflecting the braking action, e.g. the depression of a brake pedal, is regarded as almost equal to the rear wheel braking pressure so that the master cylinder pressure can be successfully used for monitoring the rear wheel braking pressure. Upon a fast braking action, however, because of viscosity in piping between the master and wheel cylinders, the master cylinder pressure is changed too fast to monitor the rear wheel braking pressure. Thus, in such a case, as the second value involved with the rear wheel braking force, having a responsibility similar to the rear wheel braking pressure, an estimation of the rear wheel pressure may be used. The estimation value may be estimated based upon the first value together with other available parameters such as a flow rate of operational fluid in a hydraulic braking system.

In one embodiment of the present invention, a braking control device is equipped on a vehicle having front and rear wheels; a braking system including wheel cylinders provided for the respective wheels, a master cylinder; and at least a master cylinder pressure sensor. But, no wheel braking pressure sensor is required. The control device also includes a hydraulic circuit establishing selective connection between the master and wheel cylinders with a plurality of solenoid valves; and a controller receiving a signal of master cylinder pressure sensor, executing processes and calculation for obtaining target pressures for the wheel cylinders based upon the signal, and selectively operating the valves. In operation, the controller judges whether or not BFD control is started based upon a master cylinder pressure detected with the master cylinder pressure sensor under a normal condition, namely, when the braking action is not fast. But, when the braking action is fast, the judgment of staring of BFD control is done based upon an estimation value of the rear wheel braking pressure. Whether or not the braking action is fast may be judged with the rate of variation of the master cylinder pressure. When the master cylinder pressure or the estimation of the rear wheel braking pressure reaches to a holding pressure determined with reference to the operational condition of the vehicle, valves in the hydraulic circuit are operated to hold the rear wheel cylinders at the holding pressure. During BFD control, further braking action for increasing the braking force on vehicle is reflected in the increment in the front wheel braking force.

According to another aspect of the present invention, in the present control device, the judgment of the starting of BFD control may be done based upon a value involved with a deceleration of a vehicle, which is considered as substantially directly reflecting the sum of braking force actually exerted on wheels. Thus, if a selected parameter involved with a deceleration has a slower responsibility to the braking action than actual rear wheel braking force, a different, more quickly responsive, parameter involved with the deceleration may be used upon a fast braking action, avoiding the delay of the starting of BFD control. In this connection, a preferable value involved with the deceleration is a deceleration value detected with deceleration sensor, the signal of which is passed through a low-pass filter having a cut-off frequency for eliminating noise. This treatment of the signal through a low-pass filter is practically inevitable. But, it will also eliminate fast components (higher frequencies) in a deceleration signal upon a fast braking action, rendering the starting of BFD control delayed. In order to avoid this delay, a different low-pass filter having higher cut-off frequency may be used (or a cut-off frequency is set higher in the same filter) only when a fast braking action is done, ensuring the accuracy or S/N ratio of the deceleration signal under a normal condition.

By the way, under BFD control, a demand from a driver of a vehicle for increasing braking force (e.g. a depression of a brake pedal) is modified for the restriction of braking force on rear wheels, which would cause the reduction of the total braking force. Thus, the driver would feel that the actually generated braking force is incompatible with his braking operation. In order to avoid this, during the execution of BFD control of constraining the rear wheel braking pressure, the braking force of the front wheel may be increased in comparison with that in the absence of BFD control, for ensuring generation of braking force on vehicle requested through the braking action.

In a preferable embodiment, the inventive device not only restricts the increase of braking force on the rear wheels by holding the rear wheel cylinders at a holding pressure determined based upon vehicle's running conditions (e.g. by closing valves in the lines to the rear wheel cylinders) but also increases braking force on the front wheels for the compensation for the shortage of braking force on rear wheels. The increment of the front wheel pressure is determined as a function of the restricted amount of the braking force on the rear wheels so as to render the resultant force increment on the front wheel equal to the force decrement on the rear wheels. Thus, the total braking force on the vehicle body can be rendered in conformity with the amount requested by a driver of the vehicle without the locking of the rear wheels and instability in the vehicle attitude induced therefrom.

In this embodiment, the increment of the front wheel braking force in this BFD control may be estimated based upon the restricted amount of the rear wheel braking pressure. If a second value involved with a rear wheel braking force is used for the judgment of starting of BFD control, the estimation of the increment for the front wheel may be done by using the second value because BFD control is started with reference to the second value.

In one embodiment of the present invention implemented in a hydraulic braking system, an increment in front wheel braking force, required through this control, may be estimated based upon a rear wheel braking pressure. In this regard, braking force generating apparatuses for the front and rear wheels, even supplied with operational fluid from a master cylinder at the same pressure, exhibit different braking performances, which decreases with the increase of a vehicle speed. Thus, in derivation of the increment to be added into the front wheel braking pressure for generating the required increment in the front wheel braking forces, an amount of a braking action by a driver of the vehicle and parameters indicating braking performances of braking force generating apparatuses of the front and rear wheels will be taken into account. Then, the precise and appropriate control of the front wheel braking force is allowed based upon pressures in a hydraulic circuit of a braking system. In this connection, for reflecting the vehicle-speed dependence of the performance of the braking force generating apparatus in the control, preferably, the braking performance indicated by the parameters should have the same vehicle-speed dependence of decreasing with the increase of a vehicle speed. For a parameter of such braking performances, useful is a vehicle speed-dependent, braking effectiveness factor of a front wheel upon a vehicle.

Further, preferably, the amount of rear wheel braking force to be decremented or the holding pressure may be determined based upon a vehicle speed, a deceleration and/or other vehicle running condition at the starting of BFD control.

The present invention is successfully applied to a hydraulic braking system, typically employed in a four-wheeled vehicle, having valves provided for individual wheel cylinders for adjusting the respective braking pressure and at least a common hydraulic line for applying braking pressure from a pressure supply to the wheel cylinders. More specifically, such a braking system has dual circuits, the one for front wheels and the other for rear wheels (front and rear (F-R) dual circuits), or the one for front-left and rear-right wheels and the other for front-right and rear-left wheels (cross (X) dual circuits), each circuit having a common line, the pressure in which is controlled with a single valve, which may be a linear solenoid valve.

Thus, it is an object of the present invention to provide new and novel devices for controlling a brake of a vehicle for executing braking force distribution among front and rear wheels of the vehicle, in which the BFD control is started at appropriate time by reducing errors of a judgment of the starting of the control.

It is another object of the present invention to provide such devices in which, depending upon operational condition of a vehicle and its braking action, a better parameter to be used for the judgment of the starting of the control is selected.

It is a further object of the present invention to provide such devices wherein, for the judgment of the starting of the control, a slowly responsive parameter involved with rear wheel braking force or pressure is selected upon a fast braking action, and thereby, avoiding premature starting of the BFD control or premature restriction of rear wheel braking force.

It is a further object of the present invention to provide such devices wherein, for the judgment of the starting of the control, a quickly responsive parameter involved with a deceleration of a vehicle is selected upon a fast braking action, and thereby, avoiding delay of starting of the BFD control or restriction of the rear wheel braking force.

It is another object of the present invention to provide such devices wherein, for the judgment of the starting of the control, a master cylinder pressure is employed usually while an estimation value of rear wheel braking pressure is employed only upon a fast braking action, and therefore no detector or sensor for acquiring wheel braking pressure is required, but BFD control is started at an appropriate time.

It is another object of the present invention to provide such devices allowing the reduction of the number of sensors or detectors and reducing the cost for manufacturing a brake system without deteriorating the performance of the BFD control device.

Other objects and advantages of the present invention will be in part apparent and in part pointed out hereinafter.

BRIEF DESCRIPTION OF THE DRAWINGS

In the accompanying drawings,

FIG. 2 is a schematic, sectional view of a pressure regulating valve employed in the hydraulic circuit shown in FIG. 1A;

DESCRIPTION OF PREFERRED EMBODIMENTS

Figure 1A:
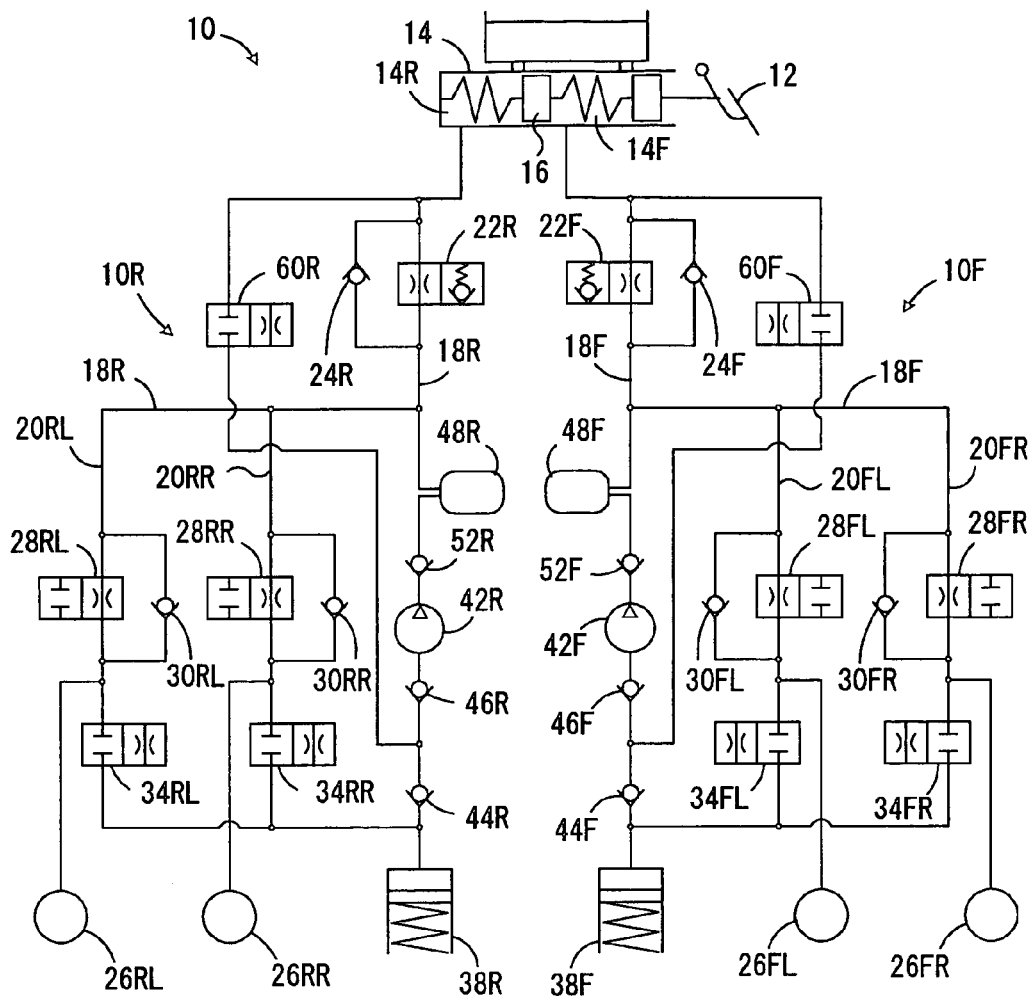
FIG. 1A is a schematic diagram of a hydraulic circuit in a braking control device for a four-wheeled vehicle of a preferred embodiment according to the present invention.
Figure 1B:
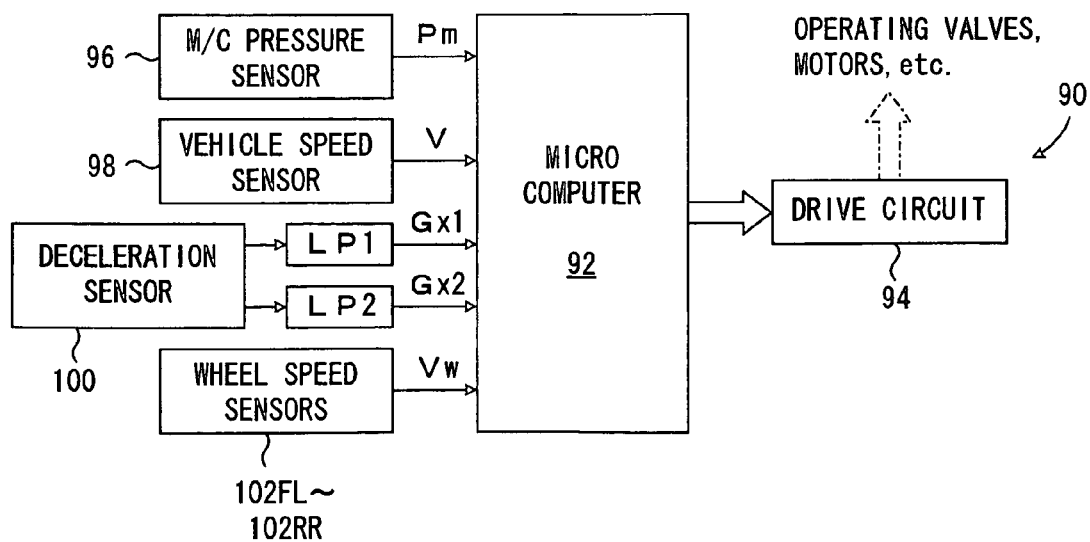
FIG. 1B is a schematic diagram of an electronic controller in a braking control device for operating the components in the hydraulic circuit shown in FIG. 1A.

FIG. 1 illustrates a schematic diagram of a braking system implementing an embodiment of a control device for controlling braking force for a vehicle, enabling BFD control according to the present invention, which braking system consists of a hydraulic circuit 10 (FIG. 1A), transmitting a pressure in a master cylinder 14 (master cylinder pressure) to wheel cylinders 26$i$ ($i$=FL, FR, RL, RR=front-left, front-right, rear-left and rear-right wheels, respectively) in braking force generating apparatuses provided for the respective wheels (not shown), and an electronic controller 90 (FIG. 1B) controlling brake fluid flows in the hydraulic circuit by operating solenoid valves and other components therein.

Referring to FIG. 1A, the illustrated hydraulic circuit 10 are of Front-Rear dual circuit type, having two circuits, the one 10F for a pair of front left and right wheel cylinders 26FL, 26FR and the other 10R for a pair of rear left and right wheel cylinders 26RL, 26RR. It should be noted that the two circuits may have the same piping structure, otherwise noted (In an actual braking system, these may be different from each other, of course).

As usual, a braking action of a driver of the vehicle, e.g. by depressing a brake pedal 12, pressurizes brake fluid in the master cylinder 14, compartmentalized into master cylinder chambers 14F and 14R with a free piston 16 movably supported with springs. To each chamber 14F, R connected is a common line 18F, R of the corresponding circuit 10F, R, respectively, leading to two branches 20$i$ connected to the respective wheel cylinders 26$i$. In each branch 20$i$, there is provided a two-state, normally opened, solenoid valve 28$i$, selectively allowing brake fluid from the common line 18F, R (i.e. from the master cylinder 14) to flow into the respective wheel cylinder 26$i$, and thereby the wheel cylinder 26$i$ will be selectively pressurized or held at a pressure by opening or closing the corresponding valve 28$i$. In order to avoid excessive pressurization of each wheel cylinder, a check valve 30$i$, allowing only flow from the wheel cylinder 26$i$ to the common line 18F, R, is provided in parallel to the solenoid valve 28$i$. The branches 20$i$ are also connected with buffer reservoirs 38F, R, provided with the respective circuit 10F, R, via two-state, normally closed, solenoid valves 34*i* as shown, so that the pressure in each of the wheel cylinders can be selectively released by opening the corresponding valve 34*i*.

Each circuit 10F, R further comprises a normally opened, linear pressure regulation valve 22F, R in the corresponding common line 18F, R; a motor-driven pump 42F, R with a damper 48F, R, positioned between the reservoir 38F, R and the common line 18F, R; and a normally closed, solenoid valve 60F, R selectively fluidly communicating the master cylinder chamber 14F, R to the corresponding pump input. These components are provided for regulating the pressure in the common line when braking pressure in a wheel cylinder 26*i* is to be increased beyond master cylinder pressure.

In detail, when the linear pressure regulation valve 22F, R and valve 60F, R are closed and opened, respectively, the master cylinder pressure is supplied to the pump input. Then, the pump 42F, R, when operated, pumps up brake fluid from the reservoir 38F, R and the master cylinder into the common line 18F, R. As described below in more detail, the linear pressure regulating valve 22F, R, when switched into a closed position, allows flow from the common line to the master cylinder only when the pressure in the common line exceeds a pressure determined by controlling the energization current supplied to solenoid coils in accordance with the controller 90. Further, since the master cylinder pressure is supplied through the valve 60F, R to the pump input, the pressure in the common line will not be lowered below the master cylinder pressure. A check valve 24F, R, connected in parallel with the regulating valve 22, also prevents the common line pressure from lowering below the master cylinder pressure. Accordingly, the pressure in the common line 18F, R is regulated at a pressure beyond the master cylinder pressure under the control of the controller 90.

Check valves 44F, R, 46F, R and 52F, R may be provided for avoiding any flow in undesirable directions. The damper 48F, R may be provided for smoothing out the pump output.

Referring to FIG. 1B, Electronic controller 90 incorporates a microcomputer 92, which may be of an ordinary type including a central processor unit, a read only memory, a random access memory, input and output port means and a common bus interconnecting these elements (not shown). The microcomputer 92 receives a signal of master cylinder pressure Pm, from a master cylinder pressure sensor 96 provided near the master cylinder 14; a signal of a vehicle speed V from a vehicle speed sensor 98; a signal of a vehicle longitudinal deceleration Gx from a longitudinal deceleration sensor 100; signals of wheel speeds Vwi from the respective wheel speed sensors 102*i*; calculates target braking pressures Pti (i=FL, FR, RL, RR) and operates the valves, pumps, etc. through a driving device 94 in accordance with a control flow and related data, memorized in the microcomputer, as explained about later. The sign of the deceleration signal Gx is defined as positive in the direction decreasing the vehicle speed.

Practically, the signals sent from the respective sensors may be passed through low-pass filters each having an appropriate cut-off frequency before received in the microcomputer 92, in order to eliminate noise components therein. The low-pass filtering of these signals, however, will make the responsibilities, namely variations, of the signals slow. In particular, any delay of a response of the deceleration signal Gx, used for the judgment of the starting of BFD control, will delay the starting of BFD control when a braking action is fast. In order to avoid this delay of the starting of BFD, two low-pass filters having different cut-off frequencies for the deceleration signal Gx are selectively used: the one, LP1 for a normal braking action and the other, LP2, for a fast braking action. The cut-off frequency Fc2 in LP2 is higher than Fc1 in LP1, but lower than a resonance frequency of an unsprung mass of a vehicle.

FIG. 2 shows a schematic diagram of the linear pressure regulating valve 22F(R), incorporating the check valve 24F(R), provided in each common line 18F, R. As shown, the valve comprises a housing 72 receiving an inlet line 18I connected to the master cylinder chamber 14F(R) and an outlet line 18O leading to the common line 18F(R) for the wheel cylinders 26*i*; a valve chamber 70; a valve body 74 movable up and down in the valve chamber; and solenoid coils 82. The inlet and outlet lines 18I, 18O are opened to the valve chamber 70 through internal lines 76 and 78, respectively.

In the absence of enegaization of the solenoids 82, the valve body 74 is biased downwardly by a compression spring 84, opening an aperture 80 of the internal line 78 for the outlet line 18O and rendering the common line 18F(R) exposed to the master cylinder pressure. When the solenoids is energized, the valve body is moved upwardly against the spring force, closing the aperture 80 and shutting out the fluid communication between the master cylinder and common line. Since, however, the common line is pressurized with the pump 42F(R), the valve body opens the aperture when the sum of the spring force and the pressure in the common line exceeds the sum of the master cylinder pressure and the electromagnetic force moving the valve body upwardly, allowing the flow from the common line to the valve chamber 70. Accordingly, the pressure in the common line 18F(R) will be regulated by adjusting the energization current supplied to the solenoids. In this connection, for ensuring this pressure regulation in the common line, the check valve 24F(R), consisting of a valve ball biased by a spring for closing an aperture 88 opened to the valve chamber 70, is provided in parallel, allowing only the flow from the valve chamber to the common line in order to maintain the common line pressure at or above the master cylinder pressure. (The pressure regulation would not work if the common line pressure is lowered below the master cylinder pressure, because the flow from the valve chamber 70 to the common line 18O would occur upon opening the aperture 80.)

In operation, the valves in the hydraulic circuit 10 are positioned as shown in FIG. 1A under normal condition (in the absence of BFD). Thus, the master cylinder pressure is directly reflected in the whole wheel cylinders 26*i*: The wheel cylinder pressures Pwi are substantially equal to the master cylinder pressure Pm.

However, when it is judged that BFD control is to be started in response to the depression of the brake pedal, etc. (the conditions requiring BFD are explained below in more detail), the valve 28RL, RR in the circuit 10R are closed, isolating the rear wheel cylinders 26RL, RR and holding them at a holding pressure Pc to be determined in a manner as described below. Further, in the circuit 10F, the regulating valve 22F and the valve 60F are closed and opened, respectively, and the pump 42F is operated. Then, only the pressures in the common line 18F and wheel cylinders 26FL, FR are varied for generating braking force on the respective front wheels by adjusting the energization current fed to the solenoids in the valve 22F with the controller 90.

Consequently, in this embodiment of the present invention, during execution of BFD control, the rear wheel cylinders are held at the holding pressure in order to prevent the locking of the rear wheels prior to the front wheels: the increase in the braking action by the driver after starting of BFD control is reflected only in the pressure in the front wheel cylinders. Under this condition, the front wheel braking pressure is increased beyond the master cylinder pressure, compensating for the shortage in the braking force due to the restriction of the pressure increase in the rear wheel cylinder.

Figure 3A:
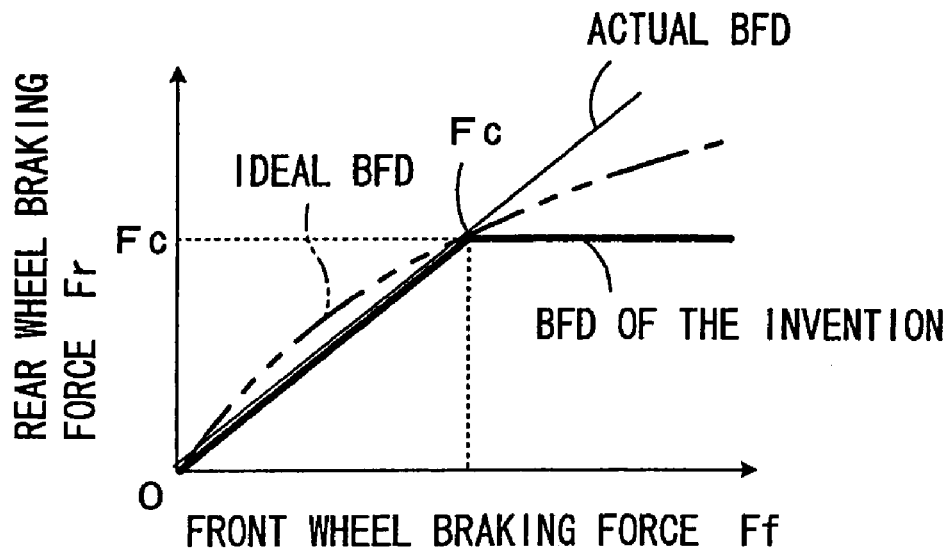
FIG. 3A shows a phase diagram of condition of braking force distribution among front and rear wheels, showing an ideal braking force distribution line (two-dotted line), an actual braking force distribution line (thin solid line) in a case that the same braking pressure is applied to the front and rear wheels; and a braking force distribution line obtained in a preferred embodiment of the present invention.
Figure 3B:
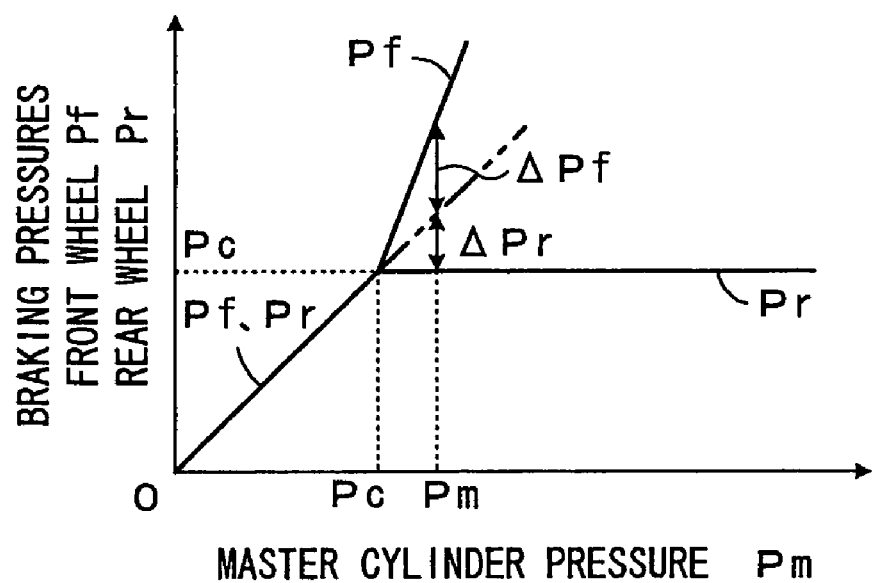
FIG. 3B shows graphs of the relations between braking pressures Pf, Pr in front and rear wheels and master cylinder pressure Pm under braking force distribution control of a preferred embodiment of the present invention.

With reference to FIGS. 3A and 3B, a control strategy in the embodiment of the present invention will be explained below.

FIG. 3A shows a phase diagram of a condition of braking force distribution among front and rear wheels, where the theoretically obtained ideal BFD line, well known in the art, (two-dot dashed line) and an actual BFD line (thin solid line) are drawn.

The ideal BFD line indicates a condition in which braking force is so distributed among the front and rear wheels that the front and rear wheels are simultaneously locked (Detailed of this line is described elsewhere). Thus, if a condition of braking force distribution is above this line, the possibility that a rear wheel will be locked prior to front wheels will be high.

The actual BFD line indicates condition in which the same pressure is applied to the wheel cylinders when a vehicle runs at a certain speed. As shown, the actual BFD line linearly increases below the ideal line and intersects with the ideal line at a certain point Fc. Thus, further increase in the rear wheel braking force along the actual line would induce the locking of the rear wheel prior to the front wheels. In order to avoid this, in the embodiment, the rear wheel braking force should be held at the force of the intersecting point Fc, i.e. further increase of the rear wheel braking force is restricted. The force Fc corresponds to a holding pressure Pc. As seen from FIG. 3A, further increase of the total braking force under the condition that the rear wheel braking force would exceed Fc, the master cylinder pressure Pm exceeds the holding pressure (Pm>Pc) is reflected in the front wheel braking force or pressure as shown in the thick line.

In this connection, it has been revealed practically that, when the vehicle speed increases, the ratio of the braking effectiveness of a front wheel to that of a rear wheel is reduced: the decrement of the braking force on a rear wheel due to the increase of the vehicle speed is smaller than that on the front wheel if the same braking pressure is applied to those wheel cylinders. Accordingly, the actual line is brought closer to the rear wheel axis (ordinate) and the intersecting point Fc is shifted toward 0 along the ideal BFD line, resulting in that the holding force or pressure Fc, Pc should be decreased with the increase of the vehicle speed.

Further, the ideal BFD line is shifted upwardly as a vehicle weight increases. In such a case, as seen from the phase of FIG. 3A, it is preferable that the holding pressure is to be increased, thereby allowing the generation of larger braking force on rear wheels without exerting excessive load on the front wheels. In order to take into account the effect of the vehicle weight on the braking force distribution, the holding pressure determined based upon the vehicle speed is preferably modified to increase as the deceleration decreases. (Supposing a certain braking force is exerted on a vehicle, the deceleration is decreased as the vehicle weight (mass) increases: Braking force=Mass×Deceleration.)

Figure 4A:
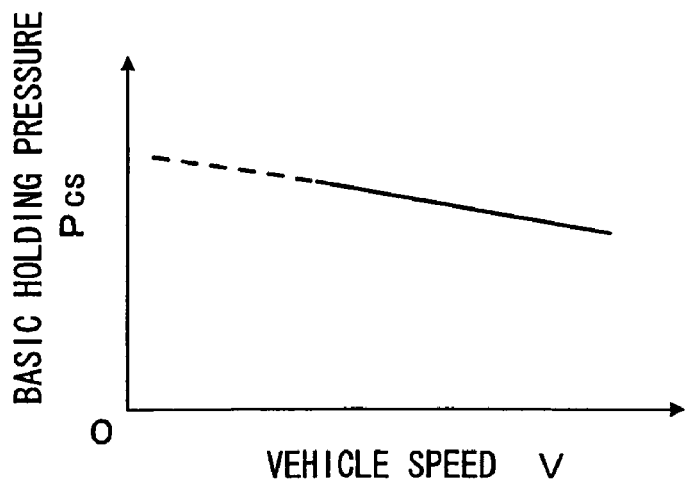
FIG. 4A shows a map of basic holding pressure for rear wheels Pcs vs. a vehicle speed V, used in calculation of the basic holding pressure.

Practically, in the present embodiment, the holding pressure Pc may be determined as a function of a vehicle speed V and a deceleration Gx by using maps of Basic holding pressure Pcs vs. Vehicle speed V as shown in FIGS. 4A and Correction pressure $\Delta$Pc vs. Deceleration Gx as shown in 4B as follows:

$$Pc = Pcs + \Delta Pc. \quad (1)$$

Figure 4B:
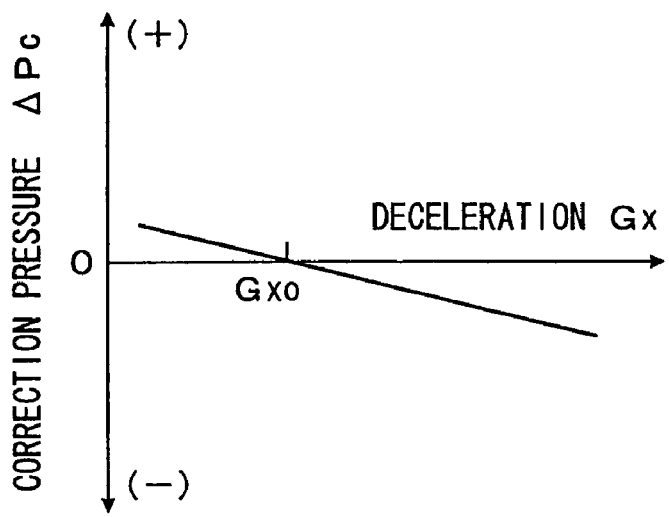
FIG. 4B shows a map of a correction pressure $\Delta Pc$ vs. deceleration Gx, used in calculation of the correction pressure.

These maps may be obtained experimentally or theoretically and memorized in the microcomputer 92. In FIG. 4B, Gxo, where $\Delta$Pc=0, may be a standard deceleration generated on a standard weighted vehicle during braking.

In accordance with the holding of the rear wheel braking pressure, the total braking force to be exerted for the vehicle will be short, while the locking of the rear wheel prior to the front wheel is prevented. Thus, in the embodiment of the present invention, the front wheel braking force is incremented for compensating for the shortage of the rear wheel braking force. With reference to FIG. 3B showing the braking pressures Pf, Pr in the front and rear wheel cylinders supplied with master cylinder Pm, the pressure Pf for the front wheels will be incremented by $\Delta$Pf, i.e. Pf=Pm+$\Delta$Pf, while the rear wheel cylinder is held at Pc. The increment $\Delta$Pf for the front wheels corresponds to the braking force that would be produced with the restricted amount in the rear wheel braking pressure $\Delta$Pr, the difference between Pm and Pr (=Pc).

Practically, the increment $\Delta$Pf will be determined as a function of the decrement of the rear wheel braking pressure, i.e. the difference between the master cylinder pressure and holding pressure: Pm–Pc, taking into accounts braking performances of the front and rear wheels and the vehicle speed-dependent braking effectiveness of the front wheels for the vehicle body as described in the followings.

Firstly, a braking force increment on the front wheel $\Delta$Ff is equal to a force decrement on the rear wheel $\Delta$Fr. $\Delta$Ff and $\Delta$Fr are given by:

$$\Delta Ff = \Delta Pfo \times (Sf \times Rf \times BEFf)$$

$$\Delta Fr = \Delta Pr \times (Sr \times Rr \times BEFr)$$

where $\Delta$Pfo is a basic front wheel braking pressure increment (before corrected with the braking effectiveness dependent upon a vehicle speed); Sf, Sr, sectional areas of the front and rear wheel cylinders; Rf, Rr, braking effective radii for the front and rear wheels; and BEFf, BEFr, braking effectiveness factors for the front and rear wheels. The sectional areas and braking effective radii are determined by specifications of the front and rear wheel braking force generating apparatus, and the braking effectiveness factors are experimentally obtained.

Since $\Delta$Ff=$\Delta$Fr is to be established, the basic front wheel braking pressure increment is given by:

$$\Delta Pfo = \Delta Pr \times (Sr \times Rr \times BEFr) / (Sf \times Rf \times BEFf) \quad (2)$$

$$= (Pm - Pc) \times (Sr \times Rr \times BEFr) / (Sf \times Rf \times BEFf).$$

Figure 5:
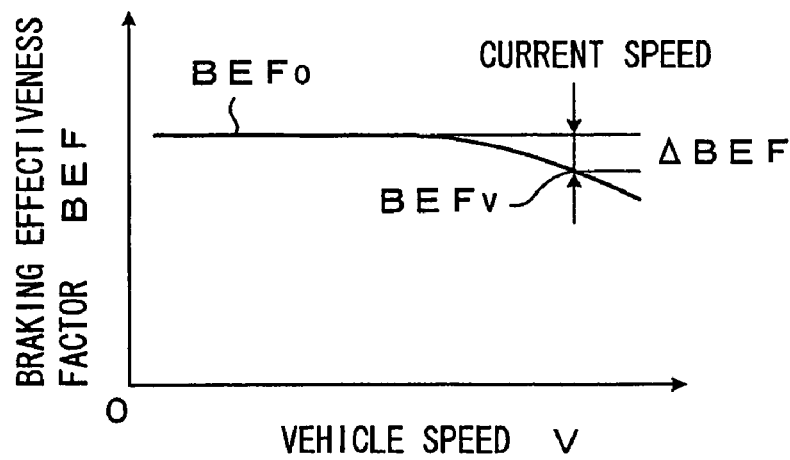
FIG. 5 shows a map of braking effectiveness factor of a front wheel on a vehicle vs. a vehicle speed, used in correction of the braking pressure increment for a front wheel.

Secondly, it has been experimentally revealed that the braking effectiveness factor of the front wheel pressure for a vehicle body, BEF, is decreased dependent upon a vehicle speed as shown in a map of FIG. 5. Thus, the basic front wheel pressure increment may be modified as follows:

$$\Delta Pf = \Delta Pfo \times (1 + \Delta BEF / BEFo) \quad (3)$$

where BEFo is a reference braking effectiveness, measured at a predetermined reference speed; and $\Delta$BEF, a deviation of the effectiveness at current speed from the reference. The calculations of expressions (2) and (3) are executed in real time with the microcomputer 92 in which all the required factors, constants and the map can be memorized to be used.

As is not shown here, a braking effectiveness of a rear wheel on the vehicle may be modified similarly with respect to its dependency upon a vehicle speed.

As noted, the front wheel braking pressure is adjusted to Pm+ΔPf through controlling the energization current fed to the pressure regulating valve 22 and operating the pump 42.

Typically, BFD control for holding the rear wheels at the holding pressure Pc may be started when the master cylinder pressure Pm reaches to the holding pressure Pc on the assumption that the rear wheel braking pressure Pr is nearly equal to the master cylinder pressure in absence of BFD control and any other control for modifying braking pressure.

Further, the BFD control may be started in response to other conditions, for instance, when the deceleration Gx exceeds a reference deceleration Gxs (a positive constant) for starting BFD control; when the difference between an average wheel speed of the front left and right wheels and that of the rear left and right wheels (ΔVw=½(VwFL+ VwFR−VwRL−VwRL) exceeds a reference speed Vws (a positive constant) for starting BFD control; and when both the conditions of the deceleration and average wheel speed are established. When BFD is stated to hold the rear wheel braking pressure in response to the conditions other than the master cylinder pressure, the pressure increment for the front wheels will be calculated by regarding the master cylinder pressure Pm at the holding as the holding pressure Pc irrespective of the maps of FIGS. 4A and 4B.

Preferably, BFD control lasts as long as Pm, Gx, or ΔVw exceeds Pc, Gxs or ΔVw. In practical, the BFD control may be terminated when either or all of Pm, Gx and ΔVw fall below the respective reference values, Pme (a positive constant); Gxe(a positive constant); and Vwe (a positive constant). The reference values, Pme, Gxe, Vwe are preferably rather smaller than the corresponding Pc, Gxs, Vws, in order to avoid hunting in the control.

It should be realized that the conditions of the starting and ending of BFD control may be theoretically and/or experimentally determined in various manners known in the art.

By the way, with reference to FIG. 1A again, the lengths of piping between the master cylinder and wheel cylinders are finite, and therefore the assumption that the rear wheel braking pressure Pr is nearly equal to the master cylinder pressure Pm will not be valid when the depression of the brake pedal 12, i.e. the pressure increase in the master cylinder is fast. In such a fast braking action, the delay of the pressure increase becomes conspicuous, causing a premature holding of the rear wheel braking force or pressure at a value lower than holding force or pressure Fc, or Pc determined with the vehicle speed and deceleration if the holding is done immediately in response to judging that Pm exceeds Pc. (This is because, at the judgment, the rear wheel braking pressure Pr would not reaches to Pm at the closing of the valve.)

Thus, in the embodiment of the present invention, in order to avoid this premature holding of the rear wheel braking force, a value involved with a rear wheel braking force, having a slower responsibility to a braking action than a master cylinder pressure, is employed for the judgment of starting BFD control. More specifically, in the present embodiment, as a preferable value having the slow responsibility, an estimation value of the rear wheel braking pressure, Pwa, is used in the judgment of the starting of BFD control, instead of Pm: until Pwa exceeds Pc, BFD control does not start closing the valves 28RL, RR to hold the rear wheel braking pressure.

For example, the estimation of the rear wheel braking pressure Pwa may be obtained through integration brake fluid flow ΔQ in the following equations:

$$\Delta Q = C \cdot A \cdot (Pm - Pwa\tau i)^{1/2} \cdot (i=0, 1, 2 \ldots) \quad (a)$$

$$\Delta Pwa\tau i = F(\Delta Q) \quad (b)$$

$$Pwa\tau i = Pwa\tau_{(i-1)} + \Delta Pwa\tau i \quad (c)$$

where ΔQ is a flow rate entering from the master cylinder to a wheel cylinder, i.e. the increment of brake fluid volume in the rear wheel cylinder per unit time; C, an appropriate constant factor; A, an effective orifice area in the piping; and Pwaτi is the estimation value of the rear wheel cylinder pressure Pwa at τi (=Σdτ) after the braking action(i is a series number). Pm−Pwaτi is a dynamic pressure difference between the master cylinder pressure and rear wheel cylinder pressure at τi, gradually decreasing with time. ΔPwaτi is the increment of the Pwa for each dτ. The function F(ΔQ) in (b) may be determined from the relation between brake fluid volume and pressure in the rear wheel cylinder, predetermined theoretically or experimentally.

Pm is directly measured with the sensor, and the initial value of Pwaτi is assumed to be zero: Pwaτ₀=0. Then, by iteratively solving the equations (a)–(c) while substituting the result of (c) into equation (a), the rear wheel cylinder pressure Pwa is estimated. This estimation process is executed independently of the process of BFD. It should be understood that the value of the rear wheel braking pressure may be estimated in other ways obvious for one of ordinary skill in the art, and the use of estimations obtained through such other ways should be within the scope of the present invention.

By use of the estimation of the rear wheel cylinder pressure Pwa, the premature holding of the rear wheel cylinder pressure due to the delay of the pressure increase thereof will be avoided even without using any wheel cylinder pressure sensor. In view of the accuracies of parameters, the master cylinder pressure, actually measured, is preferable unless the braking action is fast. Thus, the estimation of the rear wheel cylinder pressure will be used only when a fat braking action occurs.

Further, in the present embodiment, as the parameter for the judgment of the starting of BFD, the deceleration Gx may be used. As noted, the signal of deceleration Gx1 is passed through a low-pass filter LP1 (see FIG. 1B) having a cut-off frequency for the elimination of noise components so that the rising up of the signal of the deceleration is delayed relative to the actual deceleration especially upon a fast braking action. In order to avoid this delay while taking into account S/N ratio of the signal, the deceleration signal Gx2, passed through another low-pass filter LP2 (see FIG. 1B) having a higher cut-off frequency, is used for the judgment only upon a fast braking action.

The judgment that a braking action, e.g. the depression of the brake pedal, is fast may be done by using a time differential dPm of the master cylinder pressure increase. When dPm exceeds a reference value dPm0 (a positive constant), a fast braking action is judged so that the estimation of the rear wheel cylinder pressure, Pwa and deceleration signal Gx2 will take the places of Pm and Gx1, respectively. It should be realized that, upon a fast braking action, Pwa and Gx2 are closer to the actual rear wheel cylinder pressure and deceleration than Pm and Gx1, respectively, so that the formers may be also used in the determinations of the holding pressure and the increment of the front wheel braking pressure until new data are read-in.

Figure 6:
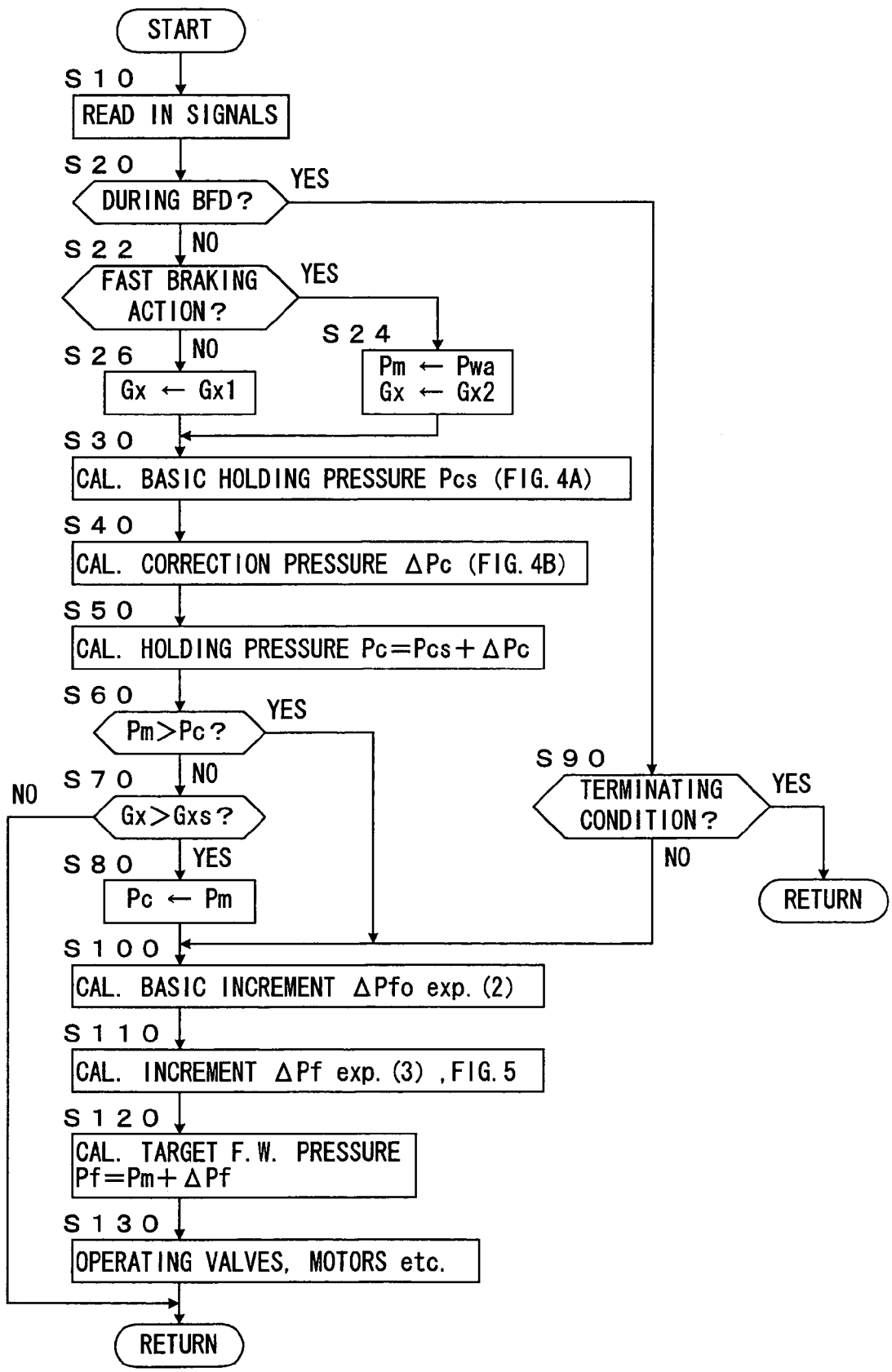
FIG. 6 is a example of a flowchart executed in a braking force distribution control device of a preferred embodiment of the present invention.

In the followings, referring to FIG. 6, the operation of the braking force distribution control device, explained above with reference to FIGS. 1A and 1B, will be described. The control according to a control routine shown in FIG. 6 is started by a closure of an ignition switch (not shown in FIG. 1) and cyclically repeated at a cycle time such as several milliseconds during the operation of the vehicle. In this routine, basically, before execution of BFD, the holding pressure Pc is calculated based upon current vehicle speed, etc. in every cycle. However, once the BFD is started, the rear wheel braking pressure is held and the variations of braking action by a driver and demand of BAC, if any, are reflected only in the front wheel braking pressure. Thus, in this case, steps of calculation of the holding pressure and judgment of the starting of BFD are bypassed until any condition for terminating the BFD is established.

Firstly, in step 10, the signals shown in FIG. 1B and the aforementioned parameters required in the following steps are read in. The estimation value Pwa, obtained by a different process is also included.

In step 20, whether or not the BFD control has been already executed is judged. If BFD is not executed, the presence of a fast braking action is judged in step 22, e.g. by judging if the rate of master cylinder pressure variation dPm exceeds a reference value dpmo, as described above. Then, if a fast braking action is judged, the estimation value Pwa is substituted into the parameter of the master cylinder pressure Pm and the deceleration signal Gx2, passed through the higher cut-off low-passed filter LP2, is regarded as deceleration parameter Gx (step 24). If not, the deceleration signal Gx1 passed through the lower cut-off low-passed filter LP1 is used (step 26). Then, a holding pressure Pc is determined in steps 30–50 based upon a vehicle speed V and a (the) deceleration Gx by using maps in FIGS. 4A and 4B.

Next, in steps 60 and 70, it is detected if BFD is to be executed. When the master cylinder pressure Pm (or the estimated value Pwa), regarded as a current rear wheel braking pressure, exceeds the holding pressure Pc(step 60) or the deceleration Gx exceeds the aforementioned reference Gxs, the judgment of starting of BFD is done and steps 100–120 for calculating the target front wheel braking pressure will be executed by using the aforementioned equations (2)–(3)together with the map in FIG. 5. If the judgment of the staring of BFD is done in Step 70, the holding pressure Pc is re-defined to be the value regarded as the current rear wheel braking pressure: Pc←Pm(or Pwa).

Then, in accordance with the above result, the valves in the hydraulic circuit are operated in steps 130. Namely, the valves for isolating the rear wheel cylinders 28RL, RR are closed while the pressure regulating valve 22F and valve 60F are closed and opened, respectively, and the pump 42F is started. Then, in order to control the front wheel braking pressure, the energization current corresponding to Pf is fed to the regulating valve 22F.

If either of conditions for starting BFD is not established in steps 60 and 70, the routine returns to Start without executing steps 100–130: without BFD control is not executed.

When BFD has been already executed in the judgment in Step 20, Step 90 is executed directly, in which it is detected if BFD is to be terminated by checking any establishment of the aforementioned conditions for terminating BFD. If BFD is to be terminated, the valves are operated so as to release the holding of the rear wheel braking pressure while ceasing the increase of the front wheel braking pressure beyond the master cylinder pressure. The process for releasing the holding may be done gradually e.g. by opening the valves 28RL, RR intermittently in order to avoid any abrupt variation of a pressure in a wheel cylinder.

If not in step 90, steps 100–130 is executed again, while bypassing steps 20–80. In step 130, the valves in the hydraulic circuit are operated so as to control only the front wheel braking pressure because the valves for holding the rear wheel cylinders have been closed in the previous cycle. Then, the process of the flowchart is restarted.

Although the present invention has been described in detail with respect to preferred embodiments thereof, it will be apparent for those skilled in the art that other various modifications are possible with respect to the shown embodiments within the scope of the present invention.

For instance, a braking system implementing the present invention may be of a type in which wheel cylinders for the respective wheels are independently controllable.

In the afore-mentioned embodiment, braking force has the identical magnitude in each of pairs of front wheels and rear wheels. However, it should be realized that, depending upon a behavior and/or a turning condition of a vehicle, the left and right wheels in each pair of wheels may be controlled so as to generate different forces.

Further, the present invention is applicable to systems where a wheel cylinder pressure sensor for each wheels is provided. In such systems, the present invention is useful in a failure of a wheel cylinder pressure sensor.

In addition, in the present embodiment, rear wheel is held at the holding pressure by closing the corresponding valve. The pressure in a rear wheel cylinder (or front wheel cylinder), however, may be controlled for maintaining a holding pressure through operation of the corresponding valves (pulsative or dithering increase or decrease) in lines connected toward a common line and/or a reservoir. In this connection, the holding force and/or holding pressure for the rear wheel may be varied depending upon a vehicle speed and/or deceleration in every cycle of the control routine during BFD control.

It should be noted that values for a holding pressure, Pc, Pcs or ΔPc and an increment for the front wheels ΔPfo, ΔPf may be determined differently without deviating the scope of the present invention. Although it is preferable to take into account vehicle speed- and deceleration-dependencies and other characteristics of these values for achieving a highly accurate and appropriate control, some of those characteristics may be ignored depending upon the required accuracy of the control and/or costs of manufacturing, operating and/or maintaining a device.

The invention claimed is:

1. A device for controlling a braking of a vehicle having front and rear wheels, a braking system generating braking forces on the respective wheels, at least one means of acquiring a first value involved with rear wheel braking forces, said at least one means including a detector detecting an amount of a braking action by a driver of the vehicle, and the device starting execution of a braking force distribution control in which braking force on the rear wheels is lowered in comparison with braking force on the front wheels in response to a judgment of starting of braking force distribution control made based upon the first value involved with rear wheel braking force, wherein the judgment of starting of braking force distribution control is made based upon a second value involved with rear wheel braking force having a slower responsibility to the braking action than the first value when an increasing rate of the braking action by the driver detected by the detector is high for the judgment of starting of braking force distribution control.

2. A device of claim 1, wherein the vehicle further comprises means of acquiring at least a first value involved with a deceleration of the vehicle, and the judgment of starting of braking force distribution is made based upon the first value involved with the deceleration of the vehicle and either of the first and second values involved with rear wheel braking force, characterized in using a second value involved with the deceleration of the vehicle having a faster responsibility to the braking action than the first value involved with the deceleration of the vehicle, instead of the first value involved with the deceleration of the vehicle, when the increasing rate of the braking action by the driver detected by the detector is high for the judgment of starting of braking force distribution control.

3. A device of claim 2, wherein the vehicle comprises a detector of detecting a deceleration of the vehicle; the first value involved with the deceleration of the vehicle is obtained by passing a value detected with the detector through a low-pass filter having a first cut-off frequency; and the second value involved with the deceleration of the vehicle is obtained by passing a value detected with the detector through a low-pass filter having a second cut-off frequency higher than the first cut-off frequency.

4. A device of claim 2, wherein the vehicle comprises a detector of detecting a deceleration of the vehicle; the values involved with the deceleration of the vehicle are obtained by passing a value detected with the detector through a low-pass filter having a cut-off frequency; and the cut-off frequency is risen up when the increasing rate of the braking action by the driver detected by the detector is high, generating the second value involved with the deceleration of the vehicle.

5. A device of claim 1 wherein braking force on the front wheels during execution of the braking force distribution control is increased, characterized in that a braking force increment on the front wheel is determined based upon an increment of the braking action estimated using the first value involved with rear wheel braking force; but, when the increasing rate of the braking action by the driver detected by the detector is high, the braking force increment is determined based upon an increment of the braking action estimated using the second value involved with rear wheel braking force.

6. A device of claim 1, wherein the braking system comprises a hydraulic circuit connected with a master cylinder and braking force generating apparatus including wheel cylinders provided for the respective wheels; and the braking action is reflected in a pressure in the master cylinder; the first value involved with rear wheel braking force is a value involved with the pressure in the master cylinder; and the second value involved with rear wheel braking force is an estimation of a pressure in the rear wheel cylinder.

7. A device of claim 6, wherein the estimation of the pressure in the rear wheel cylinder is estimated based upon flow of operational fluid into the rear wheel cylinder.

8. A device of claim 6, wherein the vehicle comprises a master cylinder pressure detector; and the value involved with the pressure in the master cylinder is a master cylinder pressure detected by the master cylinder pressure detector.

9. A device of claim 5, wherein, after starting the braking force distribution control, the increment of the braking action is estimated based upon the difference between a current first value involved with rear wheel braking force and the value involved with rear wheel braking force selected from the first and second values involved with rear wheel braking force used upon the judgment of starting of the braking force distribution executed currently.

10. A device of claim 1, wherein an increasing rate of the braking action by the driver detected by the detector is judged as high when the increasing rate exceeds a predetermined value.

11. A device for controlling a braking of a vehicle having front and rear wheels, a braking system generating braking forces on the respective wheels and a hydraulic circuit connected with a master cylinder and braking force generating apparatus including wheel cylinders provided for the respective wheels, a master cylinder pressure detector detecting a pressure in the master cylinder in which pressure of a braking action is reflected, and the device executing a braking force distribution control in which braking force on the rear wheels is lowered in comparison with braking force on the front wheels in response to a judgment of starting of braking force distribution control made based upon the master cylinder pressure detected by the master cylinder pressure detector, characterized in that the judgment of starting of braking force distribution control is made based upon an estimation value of a pressure in the rear wheel cylinder when an increasing rate of the master cylinder pressure is high.

12. A device of claim 11, wherein, when the increasing rate of the master cylinder pressure does not exceed a predetermined value, the judgment of starting of braking force distribution control is made when the master cylinder pressure exceeds a holding pressure and, when the increasing rate of the master cylinder pressure exceeds the predetermined value, the judgment of starting of braking force distribution control is made when the estimation of a pressure in the rear wheel cylinder exceeds a holding pressure.

13. A device for controlling a braking of a vehicle having front and rear wheels, a braking system generating braking forces on the respective wheels, a sensor sensing a deceleration of the vehicle and producing a deceleration signal, and a detector detecting an amount of a braking action by a driver of the vehicle, and the device starting execution of a braking force distribution control in which braking force on the rear wheels is lowered in comparison with braking force on the front wheels in response to a judgment of starting of braking force distribution control made based upon the deceleration signal, characterized in that, when an increasing rate of the braking action by the driver detected by the detector does not exceed a predetermined value, the deceleration signal is passed through a low-pass filter having a first cut-off frequency; and when an increasing rate of the braking action by the driver detected by the detector exceeds the predetermined value, the deceleration signal is passed through a low-pass filter having a second cut-off frequency higher than the first cut-off frequency.

* * * * *